United States Patent Office 2,711,929
Patented June 28, 1955

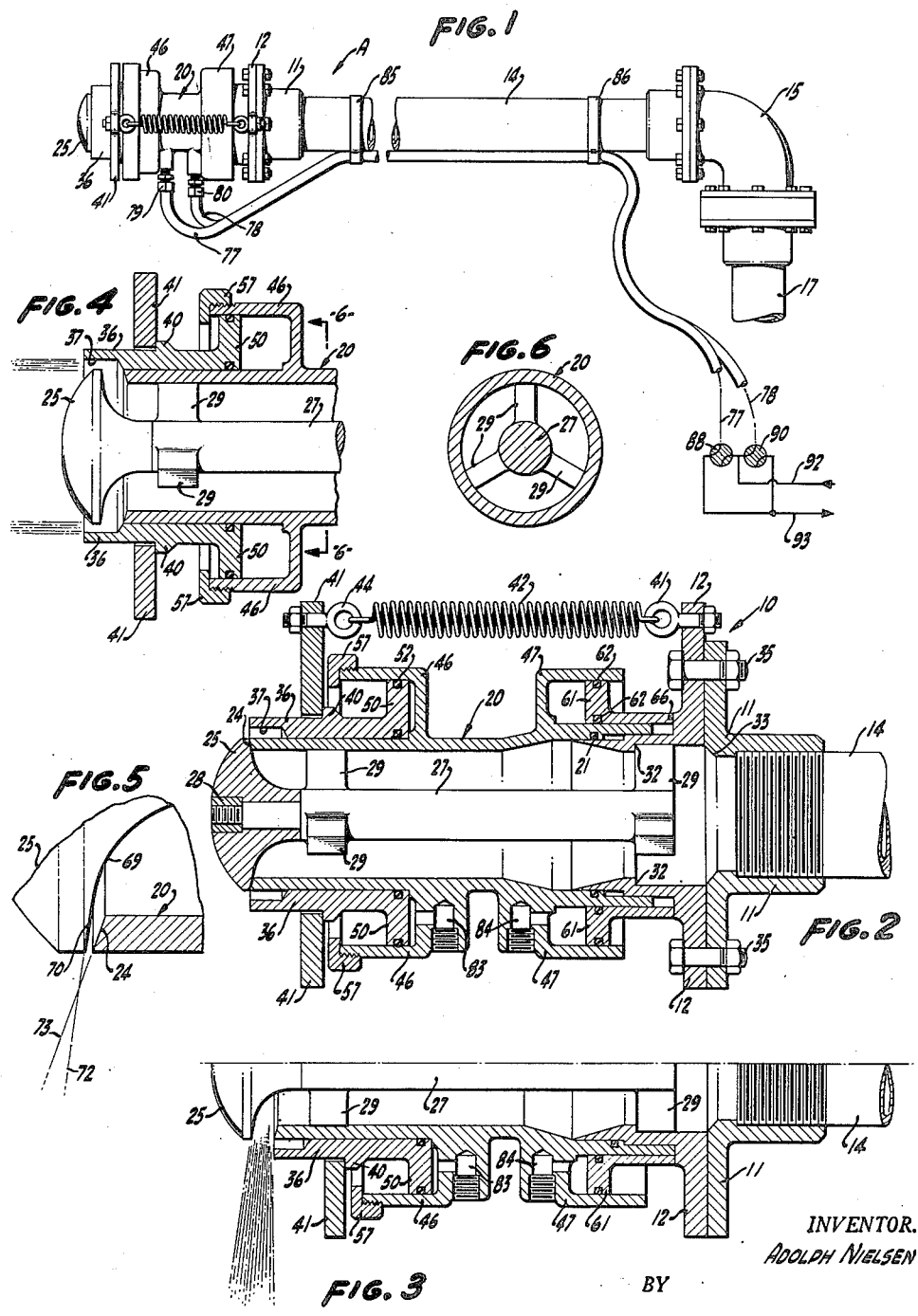

2,711,929

REMOTE CONTROLLED FIRE HOSE NOZZLE

Adolph Nielsen, Oakland, Calif.

Application July 16, 1951, Serial No. 237,002

7 Claims. (Cl. 299—131)

This invention relates to a fire hose nozzle and particularly to a remotely controlled fire hose nozzle.

There are a number of reasons for desiring to remotely control the operation of a fire hose nozzle, including the fact that some nozzles are mounted on towers. Also it is desirable to be able to position a nozzle immediately adjacent a burning structure and yet protect the person who has to control the nozzle.

A main object of the present invention is therefore to provide a fire hose nozzle which can be remotely controllable.

Another object of the present invention is to provide a remotely controlled fire hose nozzle in which fluid pressure means are utilized for operating the nozzle.

Various other objects of the invention will be apparent from the following description taken in connection with the accompanying drawings, in which:

Fig. 1 is a view in elevation of a fire hose nozzle embodying the concepts of the present invention.

Fig. 2 is a cross-sectional view taken in elevation through the nozzle disclosed in Fig. 1 and showing the parts of the apparatus in a position such that the nozzle is closed.

Fig. 3 is a view of a portion of Fig. 2 showing the parts with the valve open and in a position such as to create a divergent stream.

Fig. 4 is a fragmentary view of Fig. 2 showing the parts in another position in which a straight stream is provided.

Fig. 5 is a fragmentary view of the nozzle valve and its valve seat in relative positions for creating a particular type of widely divergent spray.

Fig. 6 is a cross-sectional view along lines 6—6 of Fig. 4 showing the manner of supporting the valve within the barrel of the nozzle.

Referring to the accompanying drawings, a fire hose nozzle embodying the concepts of the present invention is shown in Fig. 1 and designated generally by the reference numeral A. This fire hose nozzle is provided with a connecting tube generally entitled 10 which is composed of two flanged parts 11 and 12, part 11 being suitably internally threaded to receive the threaded end of a conduit 14. Conduit 14 is suitably coupled to an elbow 15 which in turn is suitably coupled to a second conduit section 17, this particular construction being one which is illustrative of a tower mount for the nozzle. It is obvious that any particular type of mount for the nozzle can be provided and the particular tower mounting is only for purposes of illustration.

The detailed construction of most of the various parts of the nozzle proper disclosed in the drawings is described in detail generally in United States Letters Patent No. 2,552,444, issued May 8, 1951, and United States Letters Patent No. 2,552,445, issued May 8, 1951 and so the details of these parts need not be elaborated here.

The member 12 of connecting tube 10 has a barrel 20 telescopically received thereover there being an O ring seal at 21 between the engaging parts of the barrel and member 12 to provide a suitable seal between the parts. There is a valve seat 24 formed on the outer end of barrel 20 adapted to cooperate with a valve 25 to open and close the nozzle. Valve 25 has a valve stem 27 suitably secured thereto such as by a nut 28, said valve stem having spiders 29 disposed within barrel 20 and member 12 of connector tube 10 near the forward and rearward ends of the valve stem. Member 12 is provided with a shoulder 32 and member 11 is provided with a shoulder 33 so that limited movement of the valve and valve stem within the connector tube is permitted, this being for the purpose of allowing assembly of the parts.

Members 11 and 12, comprising connecting tube 10, are suitably connected together through their flanged portions by nuts and bolts 35.

A cuff member 36 is telescopically received over the outer end of valve barrel 20 and has a counterbored portion 37 cooperating with valve 25 for the purpose of varying the character and spread of the stream issuing from the nozzle and being particularly useful in cooperating with the valve for providing a straight stream as shown in Fig. 4, or a stream diverging at substantially right angles as shown in Fig. 3.

An annular shoulder 40 is provided on cuff 36 and an annular plate 41 abuts thereagainst and is urged toward the connector tube 10 by suitable tension springs 42 which are connected to annular plate 41 and member 12 of connector tube 10 by suitable eye bolts 44.

Formed on barrel 20 are two oppositely facing annular cylinders 46 and 47. Within cylinder 46 a piston 50 formed on the inner end of cuff 36 is disposed, said piston having O-rings 52 extending therearound for sealingly engaging the interior surfaces of cylinder 46. There is a retainer cap 57 threaded on the outer end of cylinder 46 for the purpose of limiting the outward movement of piston 50.

A second piston 61 is provided for the nozzle and is disposed within the cylinder 47 as clearly shown in Fig. 2 and provided with suitable O-rings 62 for sealingly engaging the interior of cylinder 47. The right hand end of piston 61 as the parts are depicted in Fig. 2 bears against an annular surface 66 provided on member 12 of connector tube 10 and is maintained in engagement with member 12 by virtue of the force created by springs 42.

A modification of my nozzle and the cooperating seat is shown in Fig. 5 wherein the nozzle has a concave operative surface 69 terminating in a portion 70 which is at a more acute angle with reference to a vertical plane as the parts are depicted in Fig. 2 than the angle of the seat 24, as clearly shown in Fig. 2. With this construction, there is a resulting crossing of the stream 72 issuing from the surfaces 69 and 70 and stream 73 issuing from the surface of the valve seat 24, this crossing creating a widely divergent and mixed spray which is very useful in combating particular types of configurations.

There are means for providing fluid under pressure to the cylinders 46 and 47 and these means include fluid conduits 77 and 78 suitably coupled at 79 and 80 to cylinders 46 and 47, said cylinders having ducts 83 and 84 respectively which are threaded to receive the couplers 79 and 80. Fluid conduits 77 and 78 may be suitably supported from rigid conduit 14 by means of clamping bands 85 and 86 (see Fig. 1).

Fluid is supplied to and received from the conduits 77 and 78 by means of four-way valves 88 and 90 which are connected respectively to conduits 77 and 78. There is a fluid supply conduit 92 which is common to valves 88 and 90 and there is an exhaust or return conduit 93 which is also common to four-way valves 88 and 90. It is obvious that valves 88 and 90 can be independently manipulated to either supply the fluid to or allow return of fluid from either of the cylinders 46 and 47 at a pressure variable to maintain a desired differential upon the pistons 50 and 61.

The operation of the improved nozzle is as follows: If it is desired to close the nozzle, valve 90 is operated so as to supply fluid under pressure to cylinder 47 causing outward movement of valve barrel 20 and into seating engagement with the valve 25, thereby closing the valve. If a widely divergent spray is desired from the nozzle, the valves 88 and 90 can be operated so that both cylinders 46 and 47 are connected to return conduit 93 and therefore the parts will assume a condition such as shown in Fig. 3 with the outer ends of cuff 36 and barrel 20 in approximate alignment and with the valve 25 being disposed outwardly of its seat 24, thereby providing the divergent spray shown in Fig. 3. By suitable manipulation of the valves 88 and 90, the valve seat can be moved to closely approach the valve 25 while the deflector 36 is retracted to the position shown in Fig. 5, to deflect the stream and produce a spray diverging at substantially right angles to the axis of the nozzle.

If it is desired to provide a stream such as shown in Fig. 4, cylinder 47 is connected to return conduit 93 by means of valve 90 and cylinder 46 is connected to supply conduit 92 through valve 88, therefore causing outward movement of the cuff 36 and opening of the valve and separation of the valve 25 and the valve seat 24. Under these conditions the outer end of valve seat 24 and the inner end of counter-bore 37 are in approximate alignment as shown in Fig. 4. A substantially straight stream, as shown in Fig. 4, therefore results. It will be appreciated that any variation between the extremes described hereinbefore can be achieved by merely controlling the amount of fluid under variously balanced pressure supplied to the cylinders 46 and 47, and the relationship of the amount of pressure supplied to the force of the springs 42 will determine the relative positioning of the parts of the nozzle and the resulting changing in the character of the spray issuing from the nozzle.

Having thus described my invention, what I claim and desire to secure by Letters Patent is:

1. A device of the class described comprising a connecting tube adapted to be coupled at one end to a water supply conduit, a valve extending from the connecting tube, a barrel mounted on the other end of the tube and having a valve seat at its outer end and movable axially of the tube to control the valve opening, a deflector cuff telescopically mounted on the outer end of the barrel and movable axially thereof, a pair of oppositely facing cylinders on the barrel, a piston operatively connected to the connecting tube and disposed within one of the cylinders, a second piston on the cuff disposed within the other cylinder, spring means urging the second piston toward the connecting tube, and means for selectively supplying fluid under pressure to said cylinders.

2. A device of the class described comprising a connecting tube adapted to be coupled at one end to a water supply conduit, a valve extending from the connecting tube, a barrel mounted on the other end of the tube and having a valve seat at its outer end and movable axially of the tube to control the valve opening, a deflector cuff telescopically mounted on the outer end of the barrel and movable axially thereof, a pair of oppositely facing annular cylinders on the barrel, an annular piston operatively connected to the connecting tube and disposed within one of the annular cylinders, a second annular piston on the cuff and disposed within the other annular cylinder, means urging the second piston toward the connecting tube, and means for selectively supplying fluid under pressure to said cylinders.

3. A device of the class described comprising a connecting tube adapted to be coupled at one end to a water supply conduit, a valve extending from the connecting tube, a barrel mounted on the other end of the tube and having a valve seat at its outer end and movable axially of the tube to control the valve opening, a deflector cuff telescopically mounted on the outer end of the barrel and movable axially thereof, a pair of oppositely facing cylinders on the valve, a piston operatively connected to the connecting tube and disposed within one of the cylinders, a second piston on the cuff disposed within the other cylinder, means for urging the second piston toward the connecting tube, and means for supplying fluid under pressure to said cylinders including a single conduit for each cylinder and a four-way valve for each conduit.

4. A device of the class described comprising a connecting tube adapted to be coupled at one end to a water supply conduit, a valve extending from the connecting tube, a barrel mounted on the other end of the tube and having a valve seat at its outer end and movable axially of the tube to control the valve opening, a deflector cuff telescopically mounted on the outer end of the barrel and movable axially thereof, a pair of oppositely facing annular cylinders formed on the barrel, an annular piston operatively connected to the connecting tube and disposed within one of the annular cylinders, a second annular piston formed on the cuff and disposed within the other annular cylinder, spring means for urging the second piston toward the connecting tube, and means for selectively supplying fluid under pressure to said cylinders including a single conduit for each cylinder, a four-way valve for each conduit, a supply conduit common to the four-way valves and a return or exhaust conduit common to said four-way valves.

5. A device of the character described comprising: a connecting tube adapted to be coupled at one end to a water supply conduit; a valve extending from the connecting tube; a barrel slidably mounted on the other end of the tube and having a valve seat at its outer end and movable axially of the tube to control the valve opening; a deflector cuff slidably and telescopically mounted on the outer end of the barrel and movable axially thereof; a pair of oppositely facing cylinders on the barrel; a piston operatively connected to the connecting tube and disposed within one of the cylinders; a second piston on the cuff disposed within the other cylinder; means for urging the second piston toward the connecting tube; means for separately supplying fluid under pressure to said cylinders; and control means operable from a point remote from the pistons and cylinders for independently varying the positions of the barrel and the deflector cup to control the flow and spread of a stream projected past the valve.

6. A device of the class described comprising: a connecting tube adapted to be coupled at one end to a water supply conduit; a valve extending from the connecting tube; a barrel slidably mounted on the other end of the tube and having a valve seat at its outer end and movable axially of the tube to control the valve opening; a deflector cuff slidably mounted on the outer end of the barrel and movable axially thereof; resilient means constantly urging said barrel and said cuff toward said tube; means independently operable to slide said barrel away from said tube toward closing engagement of said valve and valve seat; means independently operable to slide said cuff outwardly from said tube to a position outwardly spaced from the valve in concentric relation thereto; and means to limit the length of travel of said cuff.

7. A device of the class described comprising: a connecting tube adapted to be coupled at one end to a water supply conduit; a barrel slidably mounted on the other end of the tube and having a valve seat at its outer end and movable axially of the tube; a valve extending from the connecting tube and engageable with the valve seat on the outer end of the barrel, said valve having a concave operative surface terminating in an outwardly diverging portion defining an acute angle with respect to the axis of the valve seat; a deflector cuff slidably and telescopically mounted on the outer end of the barrel and movable axially thereof; spring means constantly urging said barrel and cuff toward said connecting tube and away from said valve; pressure responsive means secured to the cuff to slide said cuff an outwardly extending position surrounding said valve and away from said connecting tube, pressure responsive means secured to the barrel to slide said barrel toward seating engagement with said valve and away from said connecting tube; and valve controlled means operable from a point remote from the barrel and the valve for balancing the pressures operable to displace the barrel and cuff to control the spread of a stream projected through the barrel and past the valve.

References Cited in the file of this patent

UNITED STATES PATENTS

| | | |
|---|---|---|
| 656,104 | Fricot | Aug. 14, 1900 |
| 1,050,193 | Worthen | Jan. 14, 1913 |
| 1,623,489 | Naab | Apr. 5, 1927 |
| 2,152,870 | Cannon | Apr. 4, 1939 |
| 2,552,444 | Nielsen | May 8, 1951 |
| 2,552,445 | Nielsen | May 8, 1951 |